Jan. 31, 1967  J. R. ZIEGLER  3,302,191
GAUGE CIRCUIT
Filed May 4, 1964
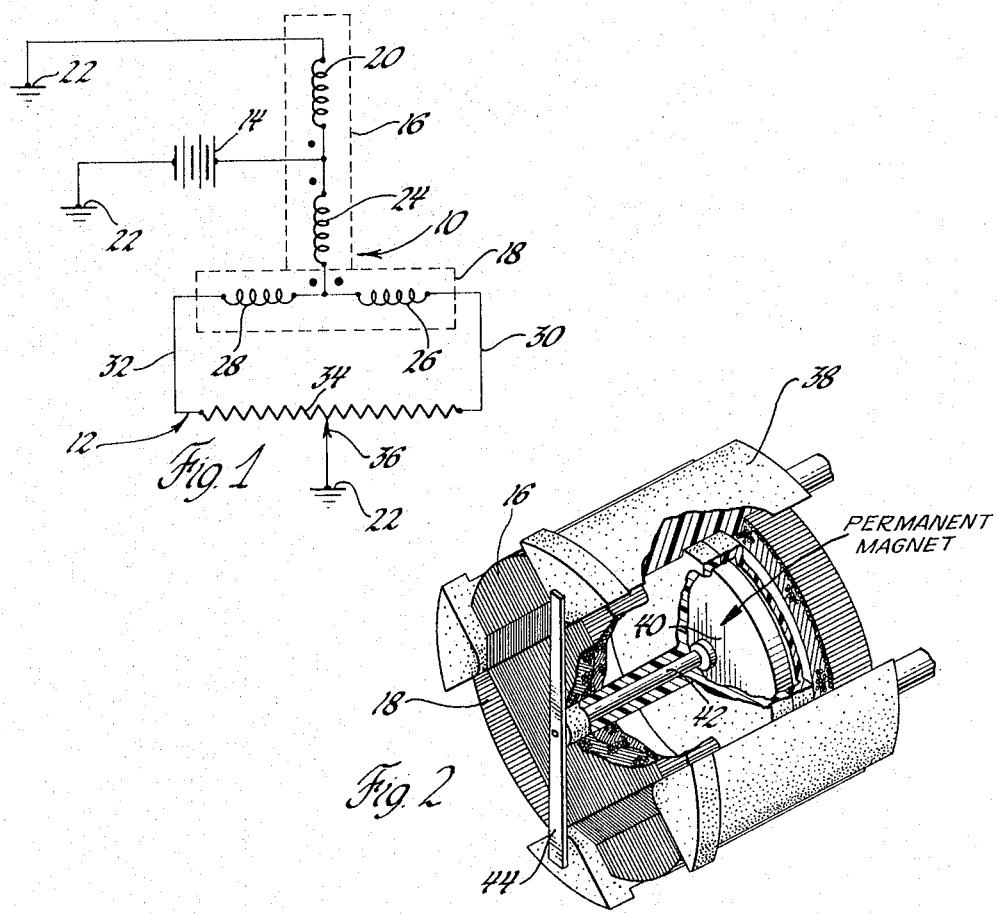
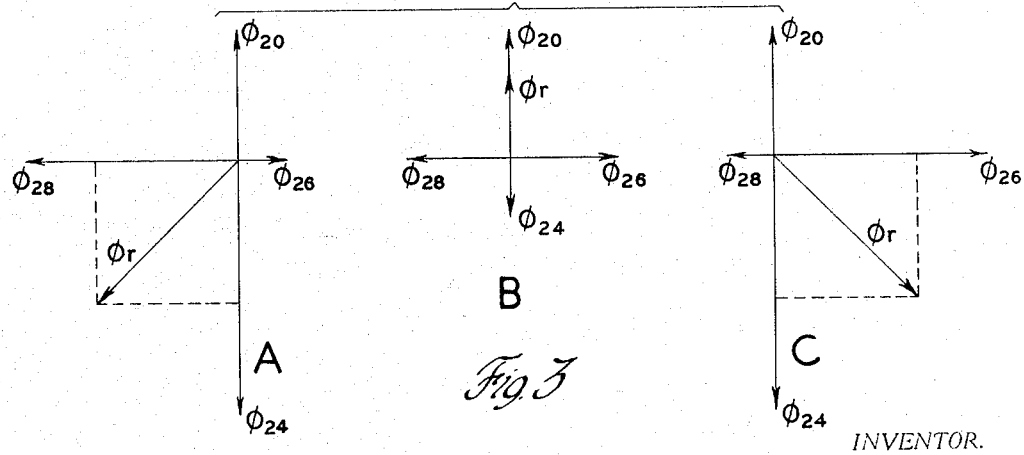
INVENTOR.
John R. Ziegler
BY Hugh L. Fisher
ATTORNEY

United States Patent Office 3,302,191
Patented Jan. 31, 1967

3,302,191
GAUGE CIRCUIT
John R. Ziegler, Flint, Mich., assignor to General Motors Corporation, Detroit, Mich., a corporation of Delaware
Filed May 4, 1964, Ser. No. 364,486
9 Claims. (Cl. 340—177)

This invention relates to electrical gauges and, more particularly, to an improved electrical circuit for use with gauges of the type employing varying electromagnetic field principles.

Electromagnetic gauges of various types are commonly used to provide a continuous indication of conditions at a remote station. A familiar example of the use of such a gauge is the fuel gauge in an automobile. These gauges commonly comprise a receiver unit which may be conveniently mounted in an automotive instrument panel to afford information to the operator, a sender unit which is located at the remote station and effective to provide a signal quantity proportional to conditions at that point being monitored and means connecting the sender and receiver units. Generally speaking, the receiver unit includes a number of coils for producing electromagnetic fields along the respective axes thereof and an armature in the form of a permanent magnet which is rotatably mounted where it is under the joint influence of the fields to be aligned with the resultant thereof. The sender unit may include a potentiometer arrangement connected to vary the ratio of current through the field producing coils in accordance with conditions such as liquid level, pressure, temperature, and so forth. Most gauges of the variety described provide an indicator needle travel which is limited to angles in the range of 60 to 90 degrees. To improve readability and also to offer certain popular styling features, it is desirable to obtain a greater needle travel; for example, up to 270°. This greater needle travel may be obtained in several ways. A first of these ways is to connect the receiver unit armature to the needle through step-up gearing. However, this gearing naturally absorbs energy and thus requires a greater torque output from the receiver unit. Another way to increase the needle travel is to provide a rather complex sender unit employing multiple resistors or by providing sender unit resistors which have a number of taps and are connected to a source such that a compound voltage waveform may be obtained from the sender unit. However, the increased cost due to the complexity of these sender units is generally prohibitive.

In accordance with the present invention, indicator needle travel in excess of 180° may be obtained from a gauge circuit of the electromagnetic type having a simple and inexpensive sender unit requiring but a single impedance element and a single displaceable contact connected to a source of reference potential and operating with the impedance element to vary the ratio of current through a plurality of field coils in the receiver unit. In general, this is accomplished by means of an improved gauge circuit having a plurality of field windings which are disposed such that first and second magnetic fields are produced in opposite directions along a first axis and third and fourth magnetic fields are produced in opposite directions along a second axis, and potentiometer means for varying the current through the various windings thereby to vary the magnitude of the respective fields produced by the windings, thus, to provide a magnetic field resultant which may be rotated through an angle significantly greater than 180°.

In a preferred form, the windings are disposed on support means at an angle of approximately 90°. The support means further carries a permanent magnet armature which is rotatably supported at the intersection of the axes of the windings and responsive to the field produced to be aligned with the resultant thereof. An indicator needle may be secured to the rotatable armature to provide the desired indication of conditions at a remote point.

The invention may be best understood by reading the following specification which describes a specific embodiment of the invention. This specification makes reference to the accompanying drawings of which:

FIGURE 1 is a schematic diagram of the circuit of the specific embodiment;
FIGURE 2 is an isometric view, partly in section, of a preferred construction for the receiver unit; and
FIGURE 3 is a group of flux vector diagrams illustrating the operation of the specific embodiment.

Referring now to FIGURE 1, the circuit is shown to include a receiver unit 10, a sender unit 12 and a source 14 of D.C. potential. The receiver unit 10 includes coils 16 and 18, each of which comprises a pair of field producing windings. More specifically, coil 16 includes windings 20 and 24 having a common axis along which flux is produced. One side of winding 20 is connected to the positive terminal of the source 14 and the other side connected to the negative terminal of the source 14 through ground 22 as shown. Thus, winding 20 is effectively connected across source 14 to provide a reference flux field in an upward or north direction as viewed in the drawings along the common axes of the windings 20 and 24. The second winding 24 has one end connected to the positive terminal of the source 14 and the other end connected to ground 22 through the combination of coil 18 and the sender unit 12 as shown. Winding 24 thus produces a variable flux field along the common axis of windings 20 and 24, but opposite in direction to the flux field produced by winding 20.

As shown in FIGURE 1, the axis of coil 18 is disposed at right angles with the axis of coil 16. Like coil 16, coil 18 includes a pair of windings 26 and 28 which are commonly connected on one side to the lower side of winding 24 as shown in the drawings. The other sides of the windings 26 and 28 are connected by means of conductors 30 and 32, respectively, to the opposite ends of a sender resistor 34. So connected, the windings 26 and 28 produce flux fields which are in opposite directions along the axis of coil 18. The sender unit 12 is further provided with a grounded wiper 36 which is in contact with resistor 34 and may be displaced along the resistor by means of an appropriate mechanism, not shown. When the gauge is employed for monitoring liquid level, this mechanism may, for example, take the form of a float and interconnecting linkage for displacing the wiper 36 along resistor 34.

To facilitate a clear understanding of the operation of the circuit shown in FIGURE 1, a description of a preferred construction for the receiver unit 10 will be described with reference to FIGURE 2. In FIGURE 2, the coils 16 and 18 are supported on a gauge body 38 which may be constructed of a suitable non-magnetic material, such as plastic. The coils 16 and 18 are disposed on the body 38 so as to be mutually perpendicular. Windings 20 and 24 of coil 16 are wound bifilarly on the body 38 as are windings 26 and 28 of coil 18. Located at the intersection of the axes of the coils 16 and 18 is a permanent magnet armature 40 in the form of a flat round disc which is diametrically magnetized. In this location, the armature 40 is within the joint influence of the fields produced by the windings of coils 16 and 18. Armature 40 is rotatably mounted by means of a shaft 42 extending through the center of armature 40 and normal thereto. Mounted on that end of the shaft 42 which protrudes through coils 16 and 18 is an indicator needle 44, the angular disposition of which is indicative of the magnetic field relation within the coils 16 and 18. The enclosure for the armature 40 may be filled with a damping substance to improve the operation of the gauge as will be apparent to those skilled in the art.

Proceeding now with a description of the operation of the specific embodiment shown in FIGURES 1 and 2, reference should be had to the flux vector diagrams of FIGURE 3. With the potentiometer wiper 36 at the far left side of resistor 34 as shown in the drawings, the flux magnitude relations between the windings 20, 24, 26 and 28 are illustrated in FIGURE 3A. Winding 20, being connected directly across source 14, produces a relatively constant reference field designated by $\phi_{20}$ extending in the upward or north direction as shown in the drawing. With the wiper 36 on the far left side of resistor 34, current from source 14 through winding 24 prefers the path through winding 28 to the path through winding 26 because of the decreased resistance thereof. Accordingly, the flux produced by winding 28 is much greater than the flux produced by winding 26. This is illustrated in FIGURE 3A by the relative magnitude of the arrows designated by $\phi_{28}$ and $\phi_{26}$. At the same time, the flux through winding 24 indicated by $\phi_{24}$ extending downwardly or in the south direction as shown in the drawing is large. Through simple vector addition it can be seen that the resultant $\phi_r$ of the four flux fields produced by the windings 20, 24, 26 and 28 points in the southwest direction as shown in FIGURE 3A. The armature 40 and needle 44 will be aligned with this resultant field thereby to convey information to an observer regarding the conditions affecting the position of wiper 36.

With the wiper 36 displaced to the center of resistor 34, the flux vector relationship is shown in FIGURE 3B. The flux $\phi_{20}$ produced by winding 20 remains constant as previously mentioned. With the wiper 36 at the center of resistor 34, currents through windings 26 and 28 are equal, thus producing equal fluxes $\phi_{26}$ and $\phi_{28}$ as shown in FIGURE 3B. The maximum resistance from the positive terminal of source 24 to ground through the combination of windings 24, 26 and 28 is encountered with the wiper 36 in the center position. Thus, the flux $\phi_{24}$ through winding 24 is small as shown. In this position, the resultant flux $\phi_r$ is in the upward or north direction as shown. The armature 40 thus aligns with the resultant flux $\phi_r$ to displace the needle 44 through an angle of 135° from that shown in FIGURE 3A.

With the wiper 36 at the far right-hand side of resistor 34 as viewed in FIGURE 1, the flux conditions produced by the windings are shown in FIGURE 3C to be the mirror image of that illustrated in FIGURE 3A. Thus, the flux produced by winding 26 is far greater than that produced by winding 28 and, thus, the resultant $\phi_r$ points in the southeast direction is shown.

Thus, it can be seen that a needle travel angle of 270° is provided by the gauge circuit of the specific embodiment. This figure is given, of course, for illustrative purposes only and various modifications to the invention as described will be apparent to those skilled in the art. These modifications may or may not affect the needle travel angle, and, thus, this embodiment is not to be construed in a limiting sense. For a definition of the invention, reference should be had to the appended claims.

What is claimed is:

1. In an indicator gauge, apparatus for producing an angularly displaceable magnetic field comprising a source of electrical energy, a first winding directly connected across the source for producing a first magnetic field of substantially constant magnitude along the axis of the first winding, second, third and fourth windings for producing second, third and fourth magnetic fields, respectively, along the winding axes, one end of the second winding being connected to the source and the other end being connected to one end of each of the third and fourth windings, the first and second windings being coaxial such that the first and second magnetic fields are in substantially direct opposition along a first common axis, and the third and fourth windings being coaxial such that the third and fourth magnetic fields are in substantially direct opposition along a second common axis, the first and second common axes intersecting at a predetermined angle, potentiometer means for varying the current through the second, third and fourth windings, thereby to vary the magnitude of the respective fields produced, the potentiometer means comprising an impedance element connected between the other ends of the third and fourth windings and contact means connected to a point of reference potential and displaceably contacting the impedance elements.

2. Apparatus as defined in claim 1 wherein the predetermined angle is substantially 90°.

3. In an indicator gauge, apparatus for producing a rotating magnetic field comprising a source of electrical energy, a first winding connected directly across the source for producing a first magnetic field of reference magnitude, second, third and fourth windings for producing second, third and fourth magnetic fields, respectively, along the winding axes, one end of the second winding being connected to the source and the other end being connected to one end of each of the third and fourth windings, the first and second windings being coaxial such that the first and second magnetic fields are in substantially direct opposition along a first common axis, and the third and fourth windings being coaxial such that the third and fourth magnetic fields are in substantially direct opposition along a second common axis, the first and second common axes intersecting at a predetermined angle, and sender means for varying the magnitude of currents through the second, third and fourth windings and including impedance means connected between the other ends of the third and fourth windings and a point of reference potential and means for inversely varying the impedance between said other end and the point of reference potential.

4. Apparatus for providing a continuous indication of the conditions at a remote station comprising a source of electrical energy, a first winding directly connected across the source for producing a first magnetic field of reference magnitude along the winding axis, second, third and fourth windings for producing second, third and fourth magnetic fields, respectively, along the winding axes, one end of the second winding being connected to the source and the other end being connected to one end of each of the third and fourth windings, the first and second windings being coaxially disposed such that the first and second magnetic fields are in substantially direct opposition along a first common axis, and the third and fourth windings being coaxially disposed such that the third and fourth magnetic fields are in substantially direct opposition along a second common axis, the first and second common axes intersecting at a predetermined angle, sender means located at the remote station and including a resistor and a grounded wiper contacting the resistor and displaceable therealong in accordance with said conditions, conductor means connecting opposite ends of the resistor to the other ends of the third and fourth windings, respectively, and a permanent magnet armature rotatably supported at the intersection of the common axes so as to be aligned with the resultant of the first, second, third and fourth magnetic fields, and pointer means rotatable with the armature.

5. Apparatus as defined in claim 4 wherein the predetermined angle is substantially 90°.

6. Apparatus for monitoring conditions at a remote station comprising an indicator unit including a first coil including first and second coaxial windings for producing first and second magnetic fields in opposite directions along a first axis, a second coil including third and fourth coaxial windings for producing third and fourth magnetic fields in opposite directions along a second axis, support means, the first and second coils being disposed on said support means such that the axes intersect at a predetermined angle at the center of the coils, a permanent magnet armature rotatably supported centrally of the coils so as to be aligned with the resultant of the magnetic fields, indicator means connected to the armature so as to be rotatable therewith, a source of direct current, the first winding being connected across the source, one end of the second winding being connected to the source and the other end being connected to one end of each of the third and fourth windings, a sender unit located at the remote station and including a resistor and a grounded wiper contacting the resistor and displaceable therealong in accordance with said condition, and conductor means connecting opposite ends of the resistor to the other ends of the third and fourth windings respectively.

7. Apparatus as defined in claim 6 wherein the predetermined angle is substantially 90°.

8. Apparatus for monitoring conditions at a remote station comprising an indicator unit including a first coil for producing a first magnetic field in a predetermined direction along a first coil axis, a second coil including first and second coaxial windings for producing second and third magnetic fields in opposite directions along a second coil axis, support means, the first and second coils being disposed on said support means such that the axes of the coils intersect at a predetermined angle at the center of the coils, a permanent magnet armature rotatably supported centrally of the coils so as to be aligned with the resultant of the magnetic field, indicator means connected to the armature and rotatable therewith, means for producing a magnetic field of substantially constant magnitude along the first axis and opposite in direction to said first magnetic field, a source of electrical energy, one end of the first coil being connected to the source and the other end being connected to one end of each of the first and second windings, a sender unit located at the remote station and including a resistor and a grounded wiper contacting the resistor and displaceable therealong in accordance with said condition, and conductor means connecting opposite ends of the resistor to the other ends of the first and second windings respectively.

9. Apparatus as defined in claim 8 wherein the predetermined angle is substantially 90°.

References Cited by the Examiner
UNITED STATES PATENTS 2,425,366 8/1947 Giers _____ 340—177
2,599,756 6/1952 Geiser _____ 340—177

NEIL C. READ, *Primary Examiner.*

THOMAS B. HABECKER, *Examiner.*